United States Patent [19]

Fukuda et al.

[11] 3,864,636

[45] Feb. 4, 1975

[54] LOCAL OSCILLATION DEVICE FOR A TELEVISION RECEIVER SET

[75] Inventors: Takeo Fukuda, Yokohama; Kenichi Torii, Tokyo; Kazuo Nishibayashi, Yokohama, all of Japan

[73] Assignee: Tokyo Shibaura Electric Co., Ltd., Kawasaki-shi, Japan

[22] Filed: Mar. 20, 1973

[21] Appl. No.: 343,100

[30] Foreign Application Priority Data

Nov. 9, 1972 Japan .............................. 47-112419
Nov. 9, 1972 Japan .............................. 47-112420

[52] U.S. Cl. ..................... 325/421, 325/470, 331/19
[51] Int. Cl. ............................................ H03b 3/08
[58] Field of Search ........... 325/470, 469, 455, 418, 325/419, 420, 421, 422, 423, 464, 465, 468, 184; 331/4, 18, 19, 25, 34, 178; 334/15, 29; 324/77 R, 77 CS

[56] References Cited

UNITED STATES PATENTS

| | | | |
|---|---|---|---|
| 3,496,473 | 2/1970 | Seppeler et al. | 325/421 |
| 3,641,434 | 2/1972 | Yates et al. | 325/421 X |
| 3,654,557 | 4/1972 | Sakamoto et al. | 325/468 X |
| 3,736,513 | 5/1973 | Wilson | 325/421 |

*Primary Examiner*—Benedict V. Safourek
*Attorney, Agent, or Firm*—Oblon, Fisher, Spivak, McClelland & Maier

[57] ABSTRACT

A harmonics generator for simultaneously producing a plurality of frequency spectra with the frequency separation equal to that of a plurality of channels, and a sweeping oscillator which initiates to sweep upon receipt of start-of-sweep signal to vary its oscillation frequency and which stops to sweep upon end-of-sweep signal to hold the frequency at the time the sweep was terminated are provided. A band pass filter is provided for deriving a beat signal when a predetermined frequency difference has appeared between the harmonics generator frequency and the sweeping oscillator frequency. Means are provided for deriving marker signals corresponding to respective channel positions from the output of the band pass filter. By counting the marker signals or by determining the coincidence of a marker signal with the tuning signal from a TV receiver set, a desired channel or channel through which electric wave is being transmitted may be selected and at the same time the frequency of the sweeping oscillator may be held constant by means of an automatic frequency control (AFC) circuit.

13 Claims, 8 Drawing Figures

LOCAL OSCILLATION DEVICE FOR A TELEVISION RECEIVER SET

BACKGROUND OF THE INVENTION

The present invention relates to a channel selection system for a TV receiver set, and particularly to such a channel selection system which can reliably and rapidly select a desired channel or an "on-the-air" channel where there exist a number of channels.

Where a huge number of broadcasting channels exist like in UHF broadcasting system, it is necessary for a UHF receiver for receiving such broadcast to reliably and rapidly select a desired channel or on-the-air channel.

To achieve this, the following prior art has been known; a harmonics generator for generating simultaneously a plurality of frequency spectra having frequency separation equal to that of a number of channels, a sweeping oscillator whose oscillating frequency varies with the start-of-sweep, and a phase comparator are provided. As the output frequency of the sweeping oscillator is varied, the phase relationship between the frequency of the sweeping oscillator and the frequency of the harmonics generator is compared and a marker signal is derived each time the phases coincide. Since these marker signals occur in correspondence with respective channel numbers, a desired channel number may be selected by counting those marker signals and immediately stopping the sweep of the sweeping generator. Since the above operation is performed with a phase locking loop being established, the output frequency of the sweep generator after the stop-of-sweep is maintained constant by means of the phase locking loop.

With the above arrangement, however, in order to maintain the establishment of the phase locking loop, the differential frequency between the signals supplied to the phase comparator from the harmonics generator and the sweeping oscillator should be maintained within ±100 KHz. Since the sweeping oscillator oscillates in a broad band such as 300 MHz, it is difficult, when taking the affects by the circuit time constants and various noises into consideration, to establish the variation of the oscillating frequency in a narrow range such as in ±100 KHz. As a result, the sweeping rate of the sweeping oscillator must be set below a predetermined value. This means that longer time is required in channel selection operation before a normal receiving condition is reached which of course is significant demerit in selecting a number of channels.

Furthermore, the phase locking loop of the type mentioned above is apt to be subjected to the affect of pulsing noise and is likely to become out-of-phase condition of the phase locking, in which case the oscillating frequency of the sweeping generator considerably deviates from the predetermined frequency resulting in loss of reception condition. This trend is remarkable particularly in a broad band oscillator, which is another serious demerit.

It is, therefore, an object of the present invention to provide a channel selection system for a TV receiver set which can select a desired channel reliably and rapidly without being affected by noises even when the sweeping rate of the sweeping oscillator is high and which can maintain the oscillating frequency of the sweeping oscillator constant after selecting the channel without being affected by noises.

SUMMARY OF THE INVENTION

The present invention comprises a harmonics generator for generating simultaneously a plurality of frequency spectra having frequency separation equal to that of a plurality of channels, a sweeping oscillator which initiates its sweep upon receipt of start-of-sweep signal and which varies its oscillating frequency, a mixer for mixing the output of the harmonics generator with the output of the sweeping oscillator, a band pass filter for deriving a beat signal from the mixer when there exists a predetermined frequency difference between the output frequency of the harmonics generator and the output frequency of the sweeping oscillator, means for deriving marker signals corresponding to respective channel positions from the output of the band pass filter, a channel selection switch for producing the start-of-sweep signal, means in response to the marker signals after the start-of-sweep for selecting a desired channel and simultaneously stopping the sweep, and an automatic frequency control (AFC) circuit for maintaining the output frequency of the sweeping oscillator after the sweep has been stopped.

Assuming that the frequency separation of the channel is 6 MHz, a local oscillation frequency (oscillating frequency of the sweeping oscillator) corresponding to, for example, the thirteenth channel is 530 MHz, and assuming that the corresponding frequency spectrum of the harmonics generator is 528 MHz (this spectrum also having separation of 6 MHz), then the differential frequency therebetween is 2 MHz. It is easy to set the frequency spectra of the harmonics generator at integral multiple of 6 such as 528, 534, . . . 822.

In order to derive a marker signal for each channel correspondingly, only odd numbered or even numbered ones of the beat signals are made available.

In accordance with a feature of the present invention, means for setting the number of desired channels such as memory means for storing numeric value corresponding to that particular channel number is provided. The marker signals are counted and when the count reaches the number corresponding to the numeric value stored in the memory the sweeping oscillator is stopped to thereby select the desired channel. By the use of the AFC circuit, it is possible to stabilize the output frequency of the sweeping oscillator after the stop-of-sweep more rapidly and with less affect by the noises than will be the case where an automatic phase control (APC) circuit is used.

In accordance with another feature of the present invention, it is possible to automatically select the on-the-air channel. This is achieved by stopping the sweep with a coincidence output of the marker signal and a tuning signal of the TV receiver set.

In accordance with further feature of the present invention, selective system may be provided which selectively selects the desired channel and the on-the-air channel.

In accordance with further feature of the present invention, a digital AFC circuit may be provided for maintaining the output frequency of the sweeping oscillator more stably after the end of channel selection.

In accordance with still further feature of the present invention, an antenna output and the harmonics generator output are sleectively supplied to the mixer by means of a switch, which is switched to the harmonics generator during selection of desired channel while it is switched to the antenna circuit simultaneously with the channel selection whereby a portion of circuit arrangement may be used in common.

DETAILED DESCRIPTION OF THE INVENTION

Figure 1:
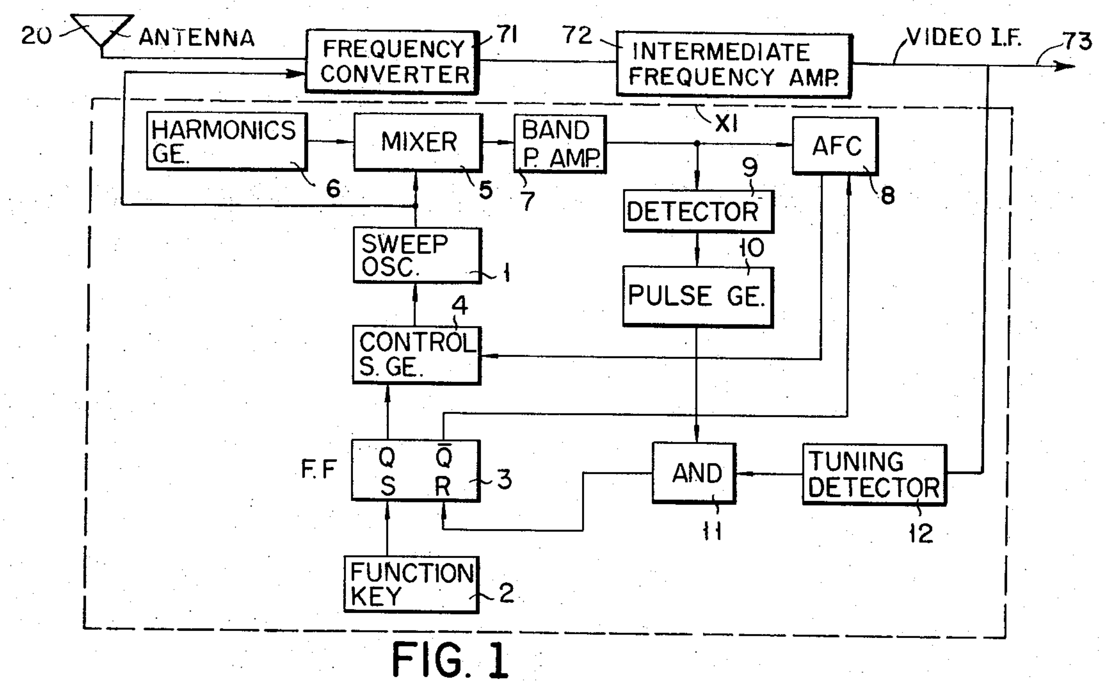
FIG. 1 is a block diagram showing one embodiment of the present invention in which an on-the-air channel is selected.

For the clarification of the description, similar parts in the respective embodiments set forth below have the same reference numerals. In FIG. 1, a sweeping oscillator 1 is controlled by switch-in of a function key 2 via a control circuit 3 (F.F. circuit) and a control signal generator 4 to increase the oscillating frequency continuously. The output of the sweeping oscillator is fed to (1) a frequency convertor circuit 71 of a TV receiver set having an antenna 20 and an intermediate frequency amplifier 72 which generates a video intermediate frequency signal 73 and to (2) a mixer 5 with an output from a harmonics generator 6. The harmonics generator 6 generates simultaneously a plurality of frequency spectra having frequency separation equal to that between a plurality of channels. As an example, if the frequency separation of the channels is 6 MHz, it generates simultaneously the frequency spectra of 528, 534, 540 . . . $(522 + 6k)$ . . . 822 MHz, where $k$=1, 2, 3 . . . 50. When the function key 2 is operated, the sweeping oscillator 1 commences its oscillation starting from 528 MHz which is 2 MHz lower than the lowest channel frequency and the oscillating frequency is continuously increased. Thus every time the output frequency of the sweeping oscillator scans the respective frequency spectra of the harmonics generator 6, the mixer 5 produces a beat signal. A band pass amplifier 7 amplifies only those beat signals which are near 2 MHz and feeds the amplified output to an AFC circuit 8 and a detector circuit 9. A pulse generator 10 shapes the output of the detector circuit 9 and supplies the $(2n-1)$th pulse signals to one input terminal of an AND circuit 11, where $n$=1, 2, 3, . . . 50. Thus, when the sweep is effected around a certain frequency spectrum of the harmonics generator with the output of the sweeping oscillator 1, since the beat signals appear at the positions 2 MHz above and below that frequency spectrum position, a pair of signals are derived from the detector circuit 9 for the particular frequency spectrum. One of the two signals, for example, the output signal at 2 MHz above the frequency spectrum position is taken out of the detector circuit 9. The pulse signal thus delivered from the pulse generating circuit 10 represents the signal indicating that of the plural frequency spectra of the harmonics generator 6 which is being swept by the output frequency of the sweeping oscillator 1, namely, the position of said swept frequency spectrum. Accordingly, the above-mentioned pulse signal is hereinafter referred to as "a marker signal."

As mentioned above, since each frequency spectrum of the harmonics generator 6 corresponds to each channel frequency (each being separated by 6 MHz), the marker signal will appear at a position 1.25 MHz apart from the lower extreme of the TV signal of, for example, 6 MHz band width, that is at a position of the sweeping oscillation frequency higher than a carrier frequency of video signal by an intermediate frequency (58.75 MHz). As a result, the marker signals can indicate respective channel positions.

A tuning signal from a tuning detector circuit 12 of the TV receiver set is applied to the other input of the AND circuit which produces a stop-of-sweep signal when the marker signal from the pulse generator circuit 11 and the tuning signal from the tuning detector circuit concurrently occur. When the stop-of-sweep signal is applied to the control circuit (F.F. circuit) 3, the AFC circuit 8 is actuated by the signal from the control circuit 3, and the output of the AFC circuit is fed to the control signal generator circuit 4, the output of which serves to maintain the output frequency of the sweeping oscillator stably.

In the above arrangement, the function switch 2 is coupled to a set terminal S of the control circuit 3 such as F.F. circuit and the output of the AND circuit 11 is coupled to reset terminal R of the control circuit 3. A signal from a set output terminal Q activates the control signal generator circuit 4 which supplies a sweeping voltage to the sweeping oscillator 1 to start the sweep. During the increase of the output frequency of the sweeping oscillator 1, the AND circuit produces no output until the receiver set tunes because no output is produced from the tuning detector circuit 12 even if the marker signal is applied from the pulse generator circuit 10 to the AND circuit 11. Thus, the output of the F.F. circuit remains in the illustrated condition permitting the sweep to continue. If the difference between the output frequency of the sweeping oscillator 1 and the frequency of an on-the-air channel (i.e., intermediate frequency signal 73 which is connected to tuning detector 12) reaches a predetermined relationship, the output signal of the tuning detector circuit 12 is applied to the AND circuit 11 and the marker signal corresponding to that channel is also applied to the AND circuit 11. The output of the AND circuit 11 is applied to the reset terminal R of the F.F. circuit 3 to reset the same so that the sweep of the sweeping generator is stopped. Since the output Q of the F.F. circuit reverses to $\overline{Q}$ at this time, the AFC circuit 8 is activated to maintain the output frequency of the sweeping oscillator 1 stably.

In accordance with the present invention, the sweep is stopped by merely depressing the function key 2 and only when the marker signal and the tuning signal coincide so that the selection of on-the-air channel is effected without erroneous operation and within an extremely short time. More particularly, the marker pulse always has a fixed level and appears at the position 2 MHz deviated from the frequency spectra having 6 MHz separation, that is, at the position of normal local oscillation frequency (sweeping oscillation frequency) which is higher than carrier frequency of video signal by intermediate frequency (58.75 MHz), the marker signal is not affected by carrier frequency of audio signal or external noise. As a result, extremely stable channel selection operation is effected. Since no mechanically moving part is included, the apparatus provides a long life. It is also obvious that on-the-air channel above or below the channel now being received may be selected by similar channel selection means.

Figure 2:
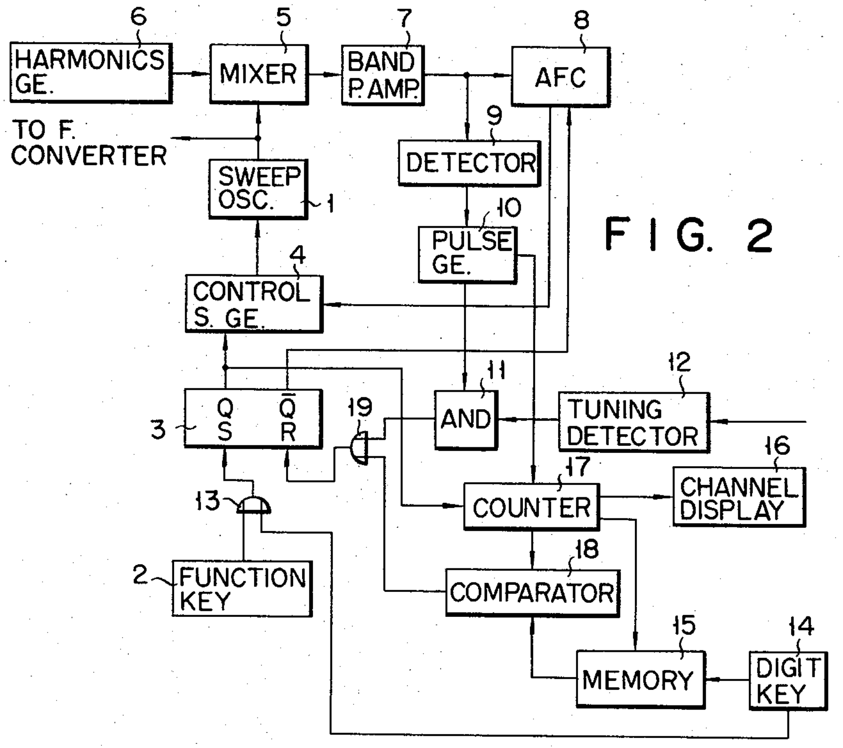
FIG. 2 is a block diagram showing another embodiment of the present invention in which a channel of desired number or an on-the-air channel is selectively selected.

Referring to FIG. 2 there is shown a channel selection apparatus for selectively selecting a channel of desired channel number and an on-the-air channel. The apparatus includes a channel selection key or a digit key 14 for selecting a particular channel desired, a sweeping switch or a function key 2 for receiving on-the-air channels sequentially as described in connection with the embodiment of FIG. 1 or for receiving on-the-air channel whose channel number is unknown, and an indicator 16 for indicating the channel number being received. To describe in more detail, added to the embodiment shown in FIG. 1 are a memory circuit 15 for storing a channel number desired depending upon the output of the channel selection switch 14 for selecting the desired channel, a counter circuit 17 for counting the marker signal pulses from the marker pulse generator circuit 10 when the set output Q is applied thereto from the first output terminal of the F.F. circuit 3 and supplying the counting pulse to the channel number indicator 16 and the memory circuit 15, a comparator circuit 18 for comparing the output of the counter circuit with the stored content of the memory circuit 15, an OR circuit 19 having the output of the AND circuit 11 and the output of the comparator circuit as inputs and supplying its output to the reset terminal R of the F.F. circuit 3, and an OR circuit 13 having the output of the function key 2 and the output of digit key 14 as inputs and supplying its output to the set terminal S of the F.F. circuit.

Assuming that the digit key 14 is set to N channel (N being 13, 14, . . . 62, for example), the memory circuit 15 stores a numeric value corresponding to the channel number N. At the same time, the signal from the digit key 14 is fed through the OR circuit 13 to the set terminal S of the F.F. circuit 3 so that, as described in FIG. 1, the sweeping oscillator 1 starts its oscillation and the frequency gradually increases from 528 MHz which is 2 MHz below the lowest channel frequency. As described in FIG. 1, by the cooperation of the harmonics generator 6, the mixer 5, the band pass amplifier 7 and the detector circuit 9, the $(2n-1)$th signal (where $n=1, 2, \ldots 50$) from the outputs of the detector circuit 9 is derived from the pulse generator circuit 10 as marker signal, which is supplied to the AND circuit sequentially. The marker signals are then counted by the counter circuit 17 sequentially. For each count, the count of the counter circuit 17 and the preset value stored in the memory circuit are compared at the comparator circuit 18. When the output frequency of the sweeping oscillator 1 reaches the frequency corresponding to the N channel to be selected, that is, when the number of the marker signal pulses counted by the counter circuit 17 reaches (2N−25), where $N=13, 14, 15, \ldots 62$, the number of the marker signal pulses supplied to the comparator circuit 18 corresponds to the numeric value preset to the memory circuit 15 and the stop-of-sweep signal is supplied from the comparator circuit 18 through the OR circuit 19 to the reset terminal R of the F.F. circuit 3. When the F.F. circuit is reset, the sweep of the sweeping oscillator stops and the AFC circuit 8 operates as described in connection with FIG. 1. Since the count of the counter circuit 17 at the time of the stop-of-sweep corresponds to the selected channel number, i.e., the N channel, the indicator circuit 16 can indicate the channel number which has been selected. In the present embodiment, it is clear that the on-the-air channel may be received by the operation of the function switch 2 as in the embodiment of FIG. 1.

Simultaneously with the stop-of-sweep, the signal from the first terminal of the F.F. circuit 3 is passed to the counter circuit 17 to cause the memory circuit 15 to store the count of the counter circuit 17. The memory circuit 15 is made up of non-volatile memory cells and hence the channel selection of the channel previously stored in the memory circuit 15 is achieved simultaneously with the power-on sequence so that when the power is switched on again the channel which has been received before can be again received either by the use of the function switch 2 or the digit switch 14.

Figure 3:
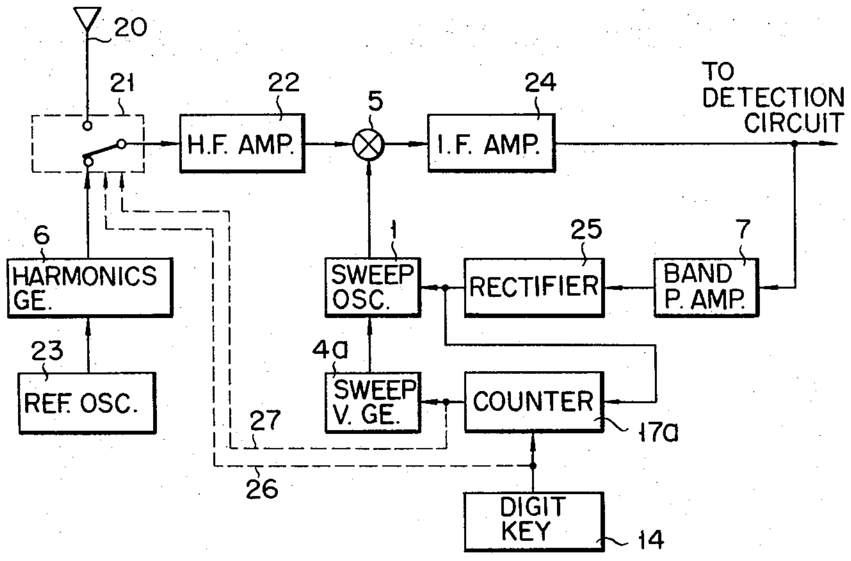
FIG. 3 is a block diagram showing further embodiment of the present invention in which an antenna output and an output of the harmonics generator are switched by a switch to be supplied to a mixer.

The embodiment shown in FIG. 3 contemplates to simplify overall circuit arrangement of the TV receiver set by permitting the insertion of the mixer and the band pass amplifier, etc., shown in FIGS. 1 and 2 into an antenna circuit. For this purpose, there is provided means for switching the output of the harmonics generator 6 and the output of the antenna 20 by means of a switch 21 and supply it to the mixer 5 through a high frequency amplifier 22. The harmonics generator 6 multiplies the output of a reference frequency oscillator 23 comprising a crystal to produce frequency spectra having frequency separation equal to the frequency separation between each channel. The switch 21 is connected to the harmonics generator 6 until the desired channel is selected. After completion of the channel selection, the antenna 20 is connected to the high frequency amplifier 22 by a switching means to be described later. The high frequency amplifier 22, the mixer 5 and the intermediate frequency amplifier 24 which amplifies an intermediate frequency delivered from said mixer 5 are all used in selecting a channel as well as in receiving the image of said selected channel. The output of the intermediate frequency amplifier 24 is fed to the detector circuit. When a desired channel button of the digit key 14 is depressed to select a desired channel, the numeric value corresponding to the desired channel is set to the counter circuit 17*a* and at the same time the harmonics generator 6 is connected to the high frequency amplifier 22 by means of the output of the digit key. The sweeping generator 1 is driven by a DC output voltage from the sweep voltage generator 4*a* and varies its output frequency depending upon the DC voltage. Simultaneously with the operation of the digit key 14 the start-to-sweep signal is applied via the counter circuit 17*a* to the sweep voltage generator circuit 4*a*. Since the sweep voltage generator 4*a* applies saw-tooth sweep voltage to the sweeping oscillator the output frequency of the sweeping oscillator varies continuously. As stated above, the mixer 5 produces a beat which is generated each time a predetermined relationship is obtained between the output frequency of the harmonics generator 6 and the output frequency of the sweeping oscillator 1. The beats are passed through the intermediate frequency amplifier 24 and only those beats which have a predetermined frequency are taken out, which beats are then rectified by the rectifier 25 and applied to the counter 17*a*.

When the numeric value set by the operation of the digit key 14 and the count of the number of the beats coincide, the counter circuit 17*a* applies a first stop-of-sweep signal to the sweep voltage generator 4*a* to stop the sweep of the sweeping oscillator 1 and simultaneously applies signal 27 to the switch 21 to connect the antenna 20 to the high frequency amplifier 22. The output frequency of the sweeping oscillator 1 is now fixed to the frequency capable of receiving the desired channel. Since the output of the rectifier 25 is applied to a frequency correction terminal of the sweeping oscillator 1, the signal passing through the band pass amplifier 7 and the rectifier 25 after reception prevents frequency variation of the sweeping oscillator 1.

Figure 4:
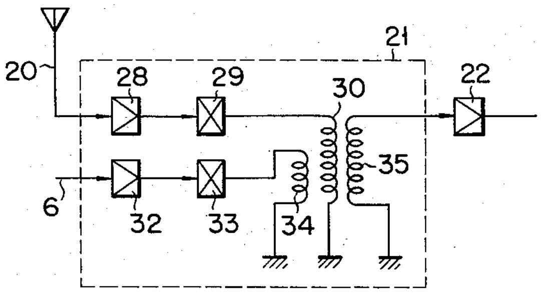
FIG. 4 is a detailed illustration of the switch shown in FIG. 3.

An example of the switch 21 is shown in FIG. 4 in which the antenna 20 is connected to an electromagnetic coil 30 through the amplifier 28 and an electronically operated switch 29, and the output terminal of the harmonics generator 6 is connected to an electromagnetic coil 34 through an amplifier 32 and an electronically operated switch 33, and an input terminal of the high frequency amplifier 22 is connected to an electromagnetic coil 35, the coils 30, 34 and 35 being electromagnetically coupled. By supplying the signal 26 from the digit key 14 to the switch 29 to open it, electromagnetically coupling only the electromagnetic coils 34 and 35, supplying the signal 27 from the counter 17*a* to the switch 33 to open it and electromagnetically coupling only the coils 30 and 35, the switching of the switch 21 is accomplished. An undesirable high frequency coupling between the antenna output terminal and the output terminal of the harmonics generator is avoided, if necessary, by a suitable shielding means or isolator means.

For the purpose of prevention of counting error due to the entry of unwanted harmonics into the mixer 5 during the sweep of the sweeping oscillator 1 and the improvement of the amplification factor during the reception and the prevention to mixed modulation, it is desirable for the high frequency amplifier 22 to employ a tuning type in which the output of the sweeping oscillator 1 is coupled together.

Figure 6:
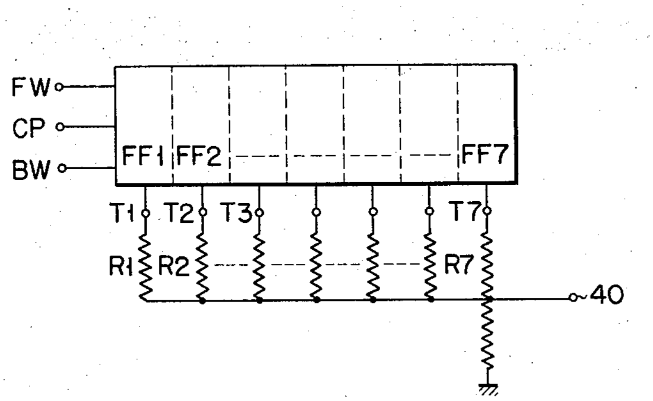
FIG. 6 shows an arrangement of a sweep voltage generator shown in FIG. 5.
Figure 7:
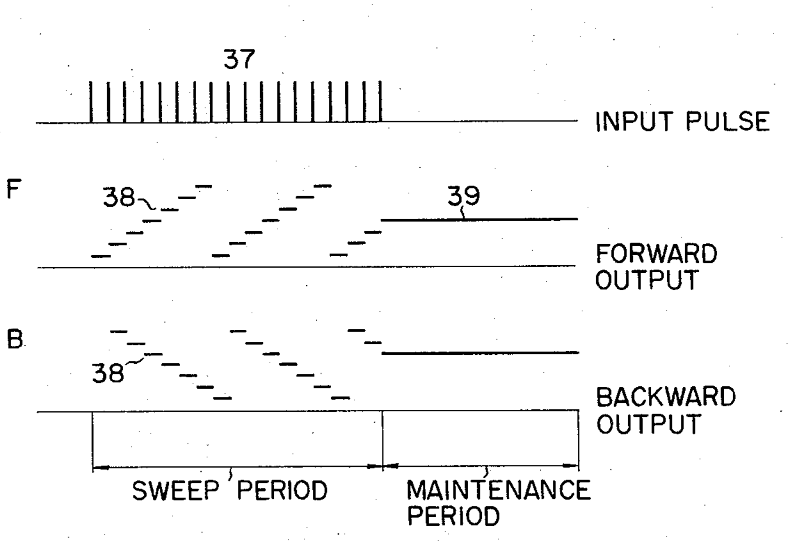
FIG. 7 shows waveforms for illustrating the operation of the sweep voltage generator shown in FIG. 6.

The arrangement of the sweep voltage generator 4*a* and the waveforms for illustrating the operation thereof are shown in FIGS. 6 and 7, respectively. The illustrated sweep voltage oscillator includes a reversible counter for counting input clock pulses either incrementally or decrementally and a D-A converter for converting the count of the counter to a D.C. voltage. As shown in FIG. 7, during the sweep of the sweeping oscillator 1, discrete saw-tooth waves 38 are produced by the input pulses 37, and when the supply of the input pulses 37 is ceased by the stop-of-sweep signal from the counter circuit 17*a*, the output thereof is maintained at a fixed D.C. voltage level 39 which corresponds to the level of the saw-tooth wave at the instant the input pulse has been ceased.

The sweep voltage generator 4a comprises, as shown in FIG. 6, a series connection of a plurality of F.F. circuits such as FF1 . . . FF7, and the respective output terminals T1 . . . T7 of those F.F. circuits have respective resistors R1 . . . R7 connected thereto. There exists a relationship $2R_{n+1}=R_n$ (n=1, 2, 3, . . .) between the resistance values of the respective resistors. CP designates an input terminal for the pulse 37, FW represents a signal input terminal for obtaining forward sweep voltage (see FIG. 7F), and BW represents a signal input terminal for obtaining backward sweep voltage (see FIG. 7B). By selectively supplying the channel selection signal to those terminals, it is possible to increase or decrease the output frequency of the sweeping oscillator 1. Control signal for the sweep is supplied from the terminal 40 to the sweeping oscillator 1.

Figure 5:
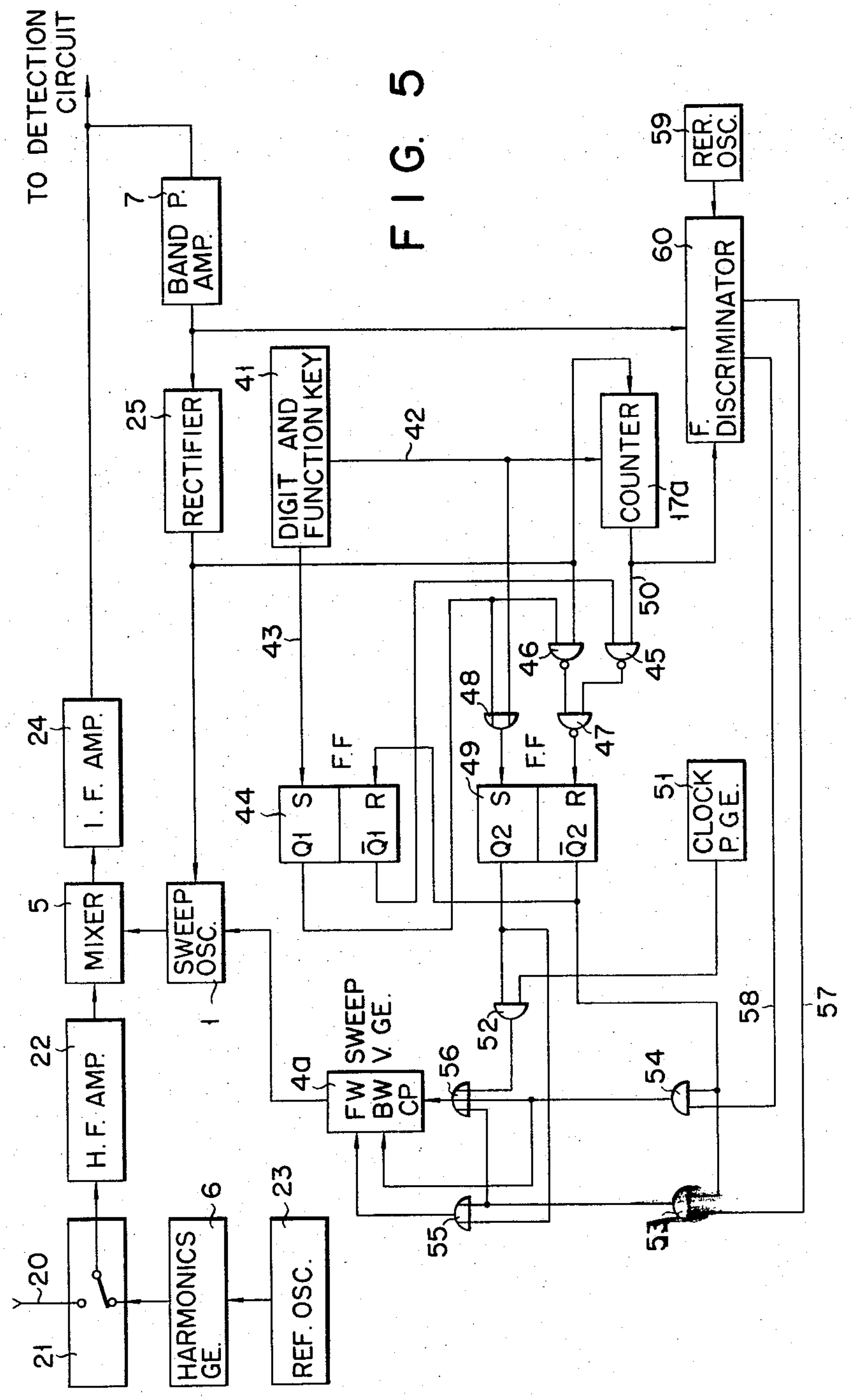
FIG. 5 is a block diagram showing still another embodiment of the present invention which includes the switch shown in FIG. 3 and in which a channel of desired number and an on-the-air channel are selectively selected.

While the embodiment of FIG. 3 shows the apparatus for selecting a desired channel, in actual case, there may be those channels among a number of channels through which no electric wave are being transmitted and there may be a case where operator or user does not remember the channel number which he wishes to select. Accordingly, there exist many circumstances where the selection of an on-the-air channel is desired or the sequential selection of the on-the-air channels only is desired. FIG. 5 shows an embodiment contemplated to meet such a requirement.

In this embodiment, a digit and function key 41 is so arranged that, when a digit key corresponding to a desired channel number is depressed, it produces a first channel selection signal (individual channel selection signal) 42 corresponding to the desired channel and a second channel selection signal (search channel selection signal) 43 for selecting only on-the-air channels when the function key is depressed. The first channel selection signal 42 is applied to the counter 17*a* to set the numeric value corresponding to the desired channel number to the counter. The second channel selection signal 43 is applied to the set terminal S of the F.F. circuit 44. Outputs from the NAND circuits 45 and 46 are conducted to the NOR circuit 47. Outputs from said NOR circuit 47 and the OR circuit 48 are supplied to the reset terminal R and the set terminal S of the F.F. circuit 49. The reset output $\overline{Q}_1$ of the F.F. circuit 44 and the output 50 of the counter 17*a* are applied to the NAND circuit 45 as inputs, and the set output $Q_1$ of the F.F. circuit 44 and the output of the rectifier 25 are applied to the NAND circuit 46 as inputs. The output of the rectifier 25 is also applied to the counter 17*a* as count pulse. The outputs of the NAND circuits 45 and 46 are applied to the NOR circuit 47 as inputs, and the output of the NOR circuit 47 and the output of the OR circuit 48 are applied to the reset terminal R of the F.F. circuit 49 and the set terminal S, respectively. There are further provided a clock pulse generator 51, AND circuits 52, 53 and 54, and OR circuit 55 and an OR circuit 56 bearing three input terminals. The AND circuit 52 receives the set output $Q_2$ of the F.F. circuit 49 and the clock pulse from the clock pulse generator 51 as its input, and the AND circuit 53 receives the reset output $\overline{Q}_2$ of the F.F. circuit 49 and a signal 57 to be described later as its input, and the AND circuit 54 receives the reset output $\overline{Q}_2$ and a signal 58 to be described later as its input. The reset output $\overline{Q}_2$ is also fed to the reset terminal R of the F.F. circuit 44. The OR circuit 55 receives the set output $Q_2$ of the F.F. circuit and the output of the AND circuit 53 as inputs, and the output of the OR circuit 55 is applied to FW terminal (see FIG. 6) of the sweep voltage generator circuit 4*a*. The three-way OR circuit 56 receives the outputs of the AND circuits 52, 53, 54 as inputs, and the output of the OR circuit 56 is applied to CP terminal, FIG. 6, of the sweep voltage generator circuit 4*a*. The output of the AND circuit 54 is also supplied to the BW terminal, FIG. 6, of the sweep voltage generator circuit.

After the stop-of-sweep and the completion of the channel selection, it is possible, as described before, to correct the variation of the output frequency of the sweeping oscillator 1 for slight out-of-tuning by supplying the output of the rectifier 25 to the frequency correction terminal of the sweeping oscillator 1. However, the correction of the output frequency of the sweeping oscillator 1 due to substantial temperatuare variation or external disturbance is difficult. For such a correction, there are provided a reference frequency oscillator 59 having oscillation frequency equal to the intermediate frequency of the video signal carrier wave and a frequency discriminator 60 to which the outputs of the band pass amplifier 7 and the counter 17*a* are applied. Also, the output signals 57 and 58, the details of which will be described later, are applied to the input terminals of the AND circuits 53, 54 respectively, whereby the output frequency of the sweeping oscillator 1 is maintained stably.

The operation of the above apparatus is now described. The F.F. circuits 44 and 49 are in their reset status during a steady state or receiving state. Under this circumstance, when a button of desired channel number in the digit key 41 is depressed (i.e., individual channel selection mode), the channel selection signal 42 thus developed serves to set that channel number to the counter 17*a* and at the same time set the F.F. circuit 49 via the OR circuit 48. Thus, $Q_2$ is set to 1 state so that the clock pulse from the clock pulse generator 51 is applied to the CP terminal of the sweep voltage generator 4*a* through the AND circuit 52 and the OR circuit 56. At the same time, the output $Q_2$ (1) is fed to the FW terminal of the sweeping voltage generator circuit 4*a* through the OR circuit 55 so that the sweep voltage generator circuit starts the sweep of the sweeping oscillator 1 in forward direction, that is, in the direction of increasing output frequency. Simultaneously with the occurrence of the first channel selection signal 42, the harmonics generator 6 is connected to the high frequency amplifier 22 as in the embodiment of FIG. 3. Also as described before in connection with FIG. 3, the beat is generated from the mixer 5. The marker signals passing through the band pass amplifier 7 appear at the rectifier 25. Since, however, the $Q_1$ of the F.F. circuit 44 is 0, the marker signals do not pass through the NAND circuit 46, but are supplied to the counter 17*a* as count pulses. When the counter 17*a* to which the channel number has been preset counts the predetermined number of marker pulses required to select the particular channel, the output 50 is generated. Since the $\overline{Q}_1$ and $Q_1$ of the F.F. circuit 44 are 1 and 0, respectively, when the signal 50 appears, the signal 1 is supplied to the reset terminal R of the F.F. circuit 49 by the cooperation of the NAND circuits 45, 46 and the NOR circuit 47, and the F.F. circuit 49 is reset. As a result, the $Q_2$ of the F.F. circuit 49 is switched to 0 and the clock pulse from the clock pulse generator 51 is no longer supplied to the CP terminal of the sweep voltage generator 4*a* and the sweep is stopped. Since the $\overline{Q}_2$ is 1 at this time, the signals 57 and 58, to be described later, are supplied through the AND circuits 53, 54, the OR circuits 55, 56 to the terminals FW, BW and CP of the sweep voltage generator circuit 4*a* in order to accomplish fine tuning of the output frequency of the sweeping oscillator 1.

The mode of operation for selecting on-the-air channels only is now described. By depressing a function key on the digit and function key 41, the second channel selection signal 43 is generated. At the same time, the antenna 20 is connected to the high frequency amplifier 22. By the second channel selection signal 43 the F.F. circuit 44 is set and the $Q_1$ and $\overline{Q}_1$ become 1 and 0, respectively. The signal $Q_1$ (1) passes through the OR circuit 48 to set the F.F. circuit 49 and $Q_2$ and $\overline{Q}_2$ become 1 and 0, respectively. At this time, no reset signal is applied to the reset terminal R of the F.F. circuit 44. When the $Q_2$ becomes 1, the clock pulse from the clock pulse generator 51 is supplied through the AND circuit 52 and the OR circuit 56 to the CP terminal of the sweep voltage generator 4*a*, and the signal $Q_2$ (1) is supplied through the OR circuit 55 to the FW terminal of the sweep voltage generator 4*a*. As a result, the sweeping oscillator 1 starts its sweep in forward direction. After the initiation of the sweep, when the differential frequency between the frequency of the on-the-air wave and the output frequency of the sweeping oscillator reaches a predetermined value, the output from the rectifier 25 at this instant causes the NAND circuit 46 and the NOR circuit 47 ($Q_1$ being 1) to reset the F.F. circuit 49 to tuurn $Q_2$ and $\overline{Q}_2$ to 0 and 1, respectively. Thus, the supply of the clock pulse to the sweep voltage generator 4a is ceased and the sweep stops. In this case, the F.F. circuit 44 may be reset with the output $\overline{Q}_2$ to facilitate subsequent function key operation. After completion of the channel selection by the function key, the frequency variation of the sweeping oscillator 1 may be prevented by the output of the circuit comprising the band pass amplifier 7 and the rectifier 25, as described above.

The operation of the reference frequency generator 59 and the frequency discriminator 60 is now described. The output 50, that is, the stop-of-sweep signal and the output of the band pass amplifier 7 are applied to the discriminator 60. If the intermediate frequency is higher than the frequency of the reference frequency generator 59, the discriminator producs the signal 58 which serves to decrease the output voltage of the sweep voltage generator 4*a* by $\Delta V$ which is proportional to the difference between these frequencies, while if the former is lower than the latter the discriminator produces the signal 57 which serves to increase by $\Delta V'$ which is proportional to the differential frequency. The discriminator may be comprised of a reversible counter. The frequency discriminator 60, after it received broadcasting wave, starts its operation by the output of the band pass amplifier, and the signal 57 is applied to the FW and CP termnals of the sweep voltage generator 4*a* through the AND circuit 53 while the signal 58 is applied to the BW and CP terminals through the AND circuit 54 to stablize the frequency of the sweeping oscillator 1.

Figure 8:
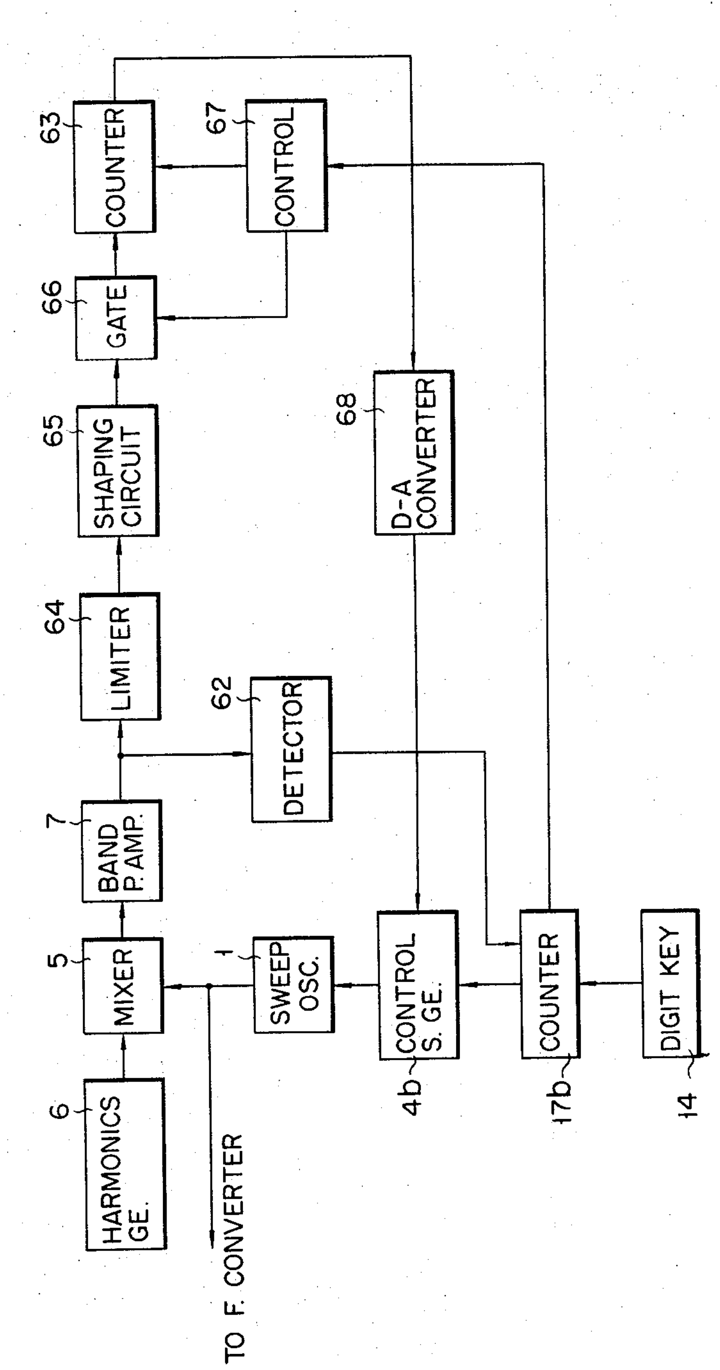
FIG. 8 is a block diagram showing still further embodiment of the present invention in which a digital AFC circuit is provided for precisely stabilizing the output frequency of the sweeping oscillator after selecting a desired channel.

Referring to FIG. 8, another embodiment of the present invention is shown wherein means are provided to stabilize the frequency of the sweeping oscillator after the stop-of-sweep precisely and rapidly in response to the output frequency of the band pass amplifier. In FIG. 8, the sweeping generator (local oscillator) 1 has its oscillation frequency controlled by the output signal from the control signal generator 46, which is operated by the start-of-sweep signal sent from a programable counter 17*b* simultaneously with the activation of the function key 14. The output signal of the sweeping oscillator 1 is passed to a frequency converter circuit, not shown, and also sequentially mixed at the mixer 5 with the frequency spectra (528, 534, . . . 822 MHz) having 6 MHz frequency separation supplied from the harmonics generator 6. The output of the mixer 5 is supplied to the 2 MHz band pass amplifier 7 in which the signals near 2 MHz only are amplified, as described in connection with FIG. 1. Portion of the output of the band pass amplifier 7 is fed to the detector 62 which in turn provides a count pulse or marker pulse to the programmable counter 17*b* each time it receives the signal from the band pass amplifier. Other portion of the output of the band pass amplifier 7 is fed through a limiter circuit 64, a shaper circuit 65 and a gate circuit 66 to the counter 63. The gate circuit 66 and the counter 63 are operated by the control signal from the control circuit 67 which in turn is activated when the count of the programmable counter 17*b* reaches a predetermined value, and the output of the counter 63 is converted to D.C. signal by a D-C converter, the converted signal then being supplied to the control signal generator 46.

Assuming that the function key 14 is operated to set the programmable counter 17*b* to the numeric value corresponding to the N channel, under this circumstance, the sweeping oscillator 1 receives the start-of-sweep signal from the control signal generator 46, which starts its oscillation from 528 MHz which is 2 MHz below the lowest channel frequency and gradually increases the output frequency. The detector 62 supplies a count pulse to the programmable counter 17*b* each time it receives 2 MHz signal from the band pass amplifier 7. When the frequency of the sweeping oscillator 1 reaches the frequency corresponding to the desired N channel, that is, when the number of the count pulses corresponds to the preset value, the programmable counter 17*b* sends the stop-of-sweep signal to the control signal generator 46 to stop the sweep of the sweeping oscillator 1.

At the same time, control signal is fed from the programable counter 17*b* to the control circuit 67. The signal from the control circuit 67 serves to open the gate circuit 66 and the counter starts its operation. The gate circuit 66 allows the 2 MHz signal pulse from the band pass amplifier 7 to pass therethrough for the time interval T only. The 2 MHz signal from the band pass amplifier then passes through the limiter circuit 64 and is shaped in the pulse shaper circuit 65. Thus, the counter 63 counts the number of waves constituting the 2 MHz signals. If the counted value number of waves in the time period $T$ is higher than $2 \times 10^6 \times T$, the signal which serves to decrease the oscillation frequency of the sweeping oscillator is fed from the D-A converter to the control signal generator circuit 46. On the other hand, if the counted value is lower than $2 \times 10^6 \times T$, the signal which serves to increase the oscillation frequency is fed from the D-A converter to the control signal generator. In this manner the output frequency of the sweeping generator 1 is kept constant. Such an automatic frequency control is referred to as digital AFC in the present invention.

With such digital AFC the range within which the frequency of the sweeping oscillator 1 can be drawn into the desired frequency even when the former deviates from the latter can be expanded considerably. As a result, in the channel selection, where the sweeping rate of the sweeping oscillator 1 is designed higher or the channel selection rate is designed higher, it is possible to rapidly control the oscillation frequency of the sweeping oscillator to the desired value even if the former substantially deviates from the latter. This makes it possible to shorten the channel selection time from on the order of 1 second, for example, in the prior art to on the order of 0.1 second. Furthermore, since no factor which is subjected to the affect of external perturbation such as pulsing noise and the like is included, the stability and the reliability of the operation are remarkably improved.

What is claimed is:

1. A local oscillation device for a television receiver set comprising:

a harmonics generator for producing simultaneously a plurality of frequency spectra having a frequency separation equal to the frequency separation among a plurality of channels, the frequency of each spectrum being an integral multiple of said separation frequency;

a sweeping oscillator for initiating its sweep in response to a start-of-sweep signal and varying its oscillation frequency;

means for supplying the output frequency from said sweeping oscillator to a frequency converter which mixes said output frequency with a television broadcasting wave frequency to obtain a predetermined video intermediate frequency, said output frequency to be supplied to the frequency convertor at a tuning condition not an integral multiple of said separation frequency;

a mixer coupled to said harmonics generator and said sweeping oscillator for obtaining beat signals produced between the frequency of said harmonics and the frequency of said sweep generator;

a band pass filter coupled to said mixer for deriving beat signals from said mixer when a predetermined frequency difference exists between the output frequency of said harmonics generator and the output frequency of the sweeping oscillator;

means coupled to said band pass filter for deriving marker signals corresponding to the respective channel positions from the output of said band pass filter;

key means coupled to said sweep oscillator through a control means for producing said start-of-sweep signal;

means for selecting a desired channel with the aid of said marker signals after the start-of-sweep and for stopping the sweep through said control means; and an automatic frequency control (AFC) circuit for maintaining the output frequency of said sweeping oscillator constant after the stop-of-sweep.

2. The local oscillation device for a television receiver set as set forth in claim 1 wherein said band pass filter has a 2 MHz pass band.

3. The local oscillation device for a television receiver set as set forth in claim 1 wherein said means for deriving the marker signals includes means for deriving signals corresponding to odd numbered ones of even numbered ones of the beat signals as said marker signals correspond to the respective channels.

4. A local oscillation device for a television receiver set comprising:

a harmonics generator for producing simultaneously a plurality of frequency spectra having a frequency separation equal to the frequency separation among a plurality of channels, the frequency of each spectrum being an integral multiple of said separation frequency;

a sweeping oscillator for initiating its sweep in response to a start-of-sweep signal and varying its oscillation frequency;

means for supplying the output frequency from said sweeping oscillator to a frequency converter which mixes said output frequency with a television broadcasting wave frequency to obtain a predetermined video intermediate frequency, said output frequency to be supplied to the frequency convertor of a tuning condition not an integral multiple of said separation frequency;

a mixer coupled to said harmonics generator and said sweeping oscillator for obtaining beat signals produced between the frequency of said harmonics and the frequency of said sweep generator;

a band pass filter coupled to said mixer for deriving beat signals from said mixer when a predetermined frequency difference exists between the output frequency of said harmonics generator and the output frequency of the sweeping oscillator;

means cupled to said band pass filter for deriving marker signals corresponding to the respective channel positions from the output of said band pass filter;

channel selection means including a digit key for supplying said start-of-sweep signal to said sweep oscillator through a control means, a counter for sequentially counting said marker signals and means for presetting a numeric value corresponding to a channel number to be selected simultaneously with the channel selection operation for producing a signal for stopping the sweep of said sweeping oscillator when the count of said counter corresponds to said preset value; and an automatic frequency control (AFC) circuit for maintaining the output frequency of said sweeping oscillator constant after the stop-of-sweep.

5. The local oscillator device for a television receiver set as set forth in claim 4 wherein said channel selection means further includes a memory circuit and a comparator circuit, said memory circuit storing the channel number to be selected by the operation of the digit key, said comparator circuit comparing the count of said counter with the stored content of said memory circuit for producing said stop-of-sweep signal when both values coincide.

6. The local oscillation device for a television receiver set as set forth in claim 4 further including an indicator circuit for indicating the channel number selected, the indicator circuit indicating the channel number corresponding to the count of said counter.

7. The local oscillation device for a television receiver set as set forth in claim 4 wherein said channel selection means includes a digit key and a programmable counter, the count of said programmable counter being set to the numeric value corresponding to the channel to be selected by said digit key, said stop-of-sweep signal being produced when the count of said counter reaches the set count of said programmable counter.

8. A local oscillation device for a television receiver set comprising:

a harmonics generator for producing simultaneously a plurality of frequency spectra having a frequency separation equal to the frequency separation among a plurality of channels, the frequency of each spectrum being an integral multiple of said separation frequency;

a sweeping oscillator for initiating its sweep in response to a start-of-sweep signal and varying its oscillation frequency;

means for supplying the output frequency from said sweeping oscillator to a frequency converter which mixes said output frequency with a television broadcasting wave frequency to obtain a predetermined video intermediate frequency, said output frequency to be supplied to the frequency convertor at a tuning condition not an integral multiple of said separation frequency;

a mixer coupled to said harmonics generator and said sweeping oscillator for obtaining beat signals produced between the frequency of said harmonics and the frequency of said sweep generator;

a band pass filter coupled to said mixer for deriving beat signals from said mixer when a predetermined frequency difference exists between the output frequency of said harmonics generator and the output frequency of the sweeping oscillator, means coupled to said band pass filter for deriving marker signals corresponding to the respective channel positions from the output of said band pass filter, a function key coupled to said sweep oscillator through a control means for producing said start-of-sweep signal, an AND circuit for producing an output only when said marker signal and a tuning signal from the TV receiver set occur concurrently, means in response to the output of said AND circuit to stop the sweep of said sweeping oscillator, and and AFC circuit for maintaining the output frequency of said sweeping oscillator constant after the stop-of-sweep.

9. The local oscillation device for a television receiver set as set forth in claim 8 wherein said band pass filter has a 2 MHz pass band.

10. The local oscillation device for a television receiver set as set forth in claim 8 wherein said means for deriving the marker signals includes means for deriving marker signals corresponding to the respective channels from odd numbered or even numbered ones of said beat signals.

11. A local oscillation device for a television receiver set comprising:

a harmonics generator for producing simultaneously a plurality of frequency spectra having a frequency separation equal to the frequency separation among a plurality of channels, the frequency of each spectrum being an integral multiple of said separation frequency;

a sweeping oscillator for initiating its sweep in response to a start-of-sweep signal and varying its oscillation frequency;

means for supplying the output frequency from said sweeping oscillator to a frequency converter which mixes said output frequency with a television broadcasting wave frequency to obtain a predetermined video intermediate frequency, said output frequency to be supplied to the frequency convertor at a tuning condition not an integral multiple of said separation frequency;

a mixer coupled to said harmonics generator and said sweeping oscillator for obtaining beat signals produced between the frequency of said harmonics and the frequency of said sweep generator;

a band pass filter coupled to said mixer for deriving beat signals from said mixer when a predetermined frequency difference exists between the output frequency of said harmonics generator and the output frequency of the sweeping oscillator, means coupled to said band pass filter for deriving marker signals corresponding to the respective channel positions from the output of said band pass filter, channel selection means for producing a first stop-of-sweep signal including a digit key for producing said start-of-sweep signal, a counter for sequentially counting said marker signals and means for presetting the numeric value corresponding to the channel number to be selected simultaneously with the channel selection operation for stopping the sweep of said sweeping oscillator when the count of said counter corresponds to said preset value, means for producing said start-of-sweep signal through the operation of a function key, an AND circuit for producing an output only when said marker signal and a tuning signal from the TV receiver set occur concurrently, means for producing a second stop-of-sweep signal for stopping the sweep of said sweeping oscillator in response to the output of said AND circuit, and an automatic frequency control (AFC) circuit for maintaining the output of said sweeping oscillator constant after the stop-of-sweep.

12. The local oscillation device for a television receiver set as set forth in claim 11 further comprising a control circuit including a set terminal, reset terminal and first and second output terminals and a control signal generator circuit for said sweeping oscillator, the signals from said function key and said digit key being applied to said set terminal, said first and second stop-of-sweep signals being applied to said reset terminal of said control circuit, the output from said first output terminal of said control circuit being applied to the input terminal of said control signal generator circuit to activate it, and the output from the second output terminal of said control circuit being applied to said AFC circuit to activate the AFC circuit simultaneously with the stop-of-sweep.

13. A local oscillation device for a television receiver set comprising:

a harmonics generator for producing simultaneously a plurality of frequency spectra having a frequency separation equal to the frequency separation among a plurality of channels, the frequency of each spectrum being an integral multiple of said separation frequency;

a sweeping oscillator for initiating its sweep in response to a start-of-sweep signal and varying its oscillation frequency, means for supplying the output frequency from said sweeping oscillator to a frequency convertor which mixes said output frequency with a television broadcasting wave frequency to obtain a predetermined video intermediate frequency, said output frequency to be supplied to the frequency convertor at a tuning condition not an integral multiple of said separation frequency;

a mixer coupled to said harmonics generator and said sweeping oscillator for obtaining beat signals produced between the frequency of said harmonics and the frequency of said sweep generator;

a band pass filter coupled to said mixer for deriving beat signal from said mixer when a predetermined frequency difference exists between the output frequency of said harmonic generator and the output frequency of said sweeping oscillator, means coupled to said band pass filter for deriving marker signals corresponding to the respective channel positions from the output of said band pass filter, channel selection means including a digit key for producing said start-of-sweep signal, a counter for sequentially counting said marker signals and means for presetting the numeric value corresponding to the channel selection operation for stopping the sweep of said sweeping oscillator when the count of said counter corresponds to said preset value, and a digital automatic frequency control (AFC) circuit for counting the number of waves constituting the output signals from said band pass filter after the stop-of-sweep and controlling the output frequency of said sweeping oscillator with said count so as to maintain the output frequency of said band pass filter at a predetermined frequency.

* * * * *